(12) United States Patent
Chen

(10) Patent No.: US 6,953,284 B2
(45) Date of Patent: Oct. 11, 2005

(54) DUSTPROOF STRUCTURE FOR A SLEEVE BEARING

(75) Inventor: Wen-Kuan Chen, Kaohsiung (TW)

(73) Assignee: Sunonwealth Electric Machine Industry Co., Ltd., Kaohsiung (TW)

(*) Notice: Subject to any disclaimer, the term of this patent is extended or adjusted under 35 U.S.C. 154(b) by 55 days.

(21) Appl. No.: 10/739,074

(22) Filed: Dec. 19, 2003

(65) Prior Publication Data
US 2005/0135715 A1 Jun. 23, 2005

(51) Int. Cl.⁷ ............................... F16C 33/74
(52) U.S. Cl. ............... 384/144; 384/119; 384/488
(58) Field of Search ................. 384/144, 129, 384/488, 119, 124

(56) References Cited

U.S. PATENT DOCUMENTS 6,336,745 B1   1/2002   Horng et al.
6,398,414 B1 * 6/2002   Chen ................... 384/120
6,435,722 B1   8/2002   Horng

* cited by examiner

Primary Examiner—Lenard A. Footland
(74) Attorney, Agent, or Firm—Bacon & Thomas, PLLC

(57) ABSTRACT

A dustproof structure for a sleeve bearing includes an axial tube, a sleeve bearing, a dustproof cushion and a motor rotor. The motor rotor has a shaft seat and a shaft mounted thereto. The axial tube accommodates the sleeve bearing which bears an axial hole through which the shaft of the motor rotor is freely extended. The dustproof cushion is mounted in the axial tube and attached to an end surface of the sleeve bearing to prevent from entering foreign dust. An axial thickness of the dustproof cushion is used to compensate a clearance formed between the sleeve bearing and the shaft seat, and a diameter of the dustproof cushion is smaller than an outer diameter of the shaft seat to prevent from precipitation of dust on the sleeve bearing.

6 Claims, 6 Drawing Sheets

DUSTPROOF STRUCTURE FOR A SLEEVE BEARING

BACKGROUND OF THE INVENTION

1. Field of the Invention

The present invention is related to a dustproof structure for a sleeve bearing. More particularly, the present invention is related to the dustproof structure having a dustproof cushion attached to the oil-impregnated sleeve bearing to thereby prevent from dust precipitation.

2. Description of the Related Art

Referring to FIG. 1, a conventional bearing structure for a motor consists of an axial seat 10, a motor stator 20, a motor rotor 30. The axial seat 10 is combined with an axial tube 11 in which to accommodate a sleeve bearing 12, and on which to couple the motor stator 20. In assembling, a shaft 31 of the motor rotor 30 extends through an axial hole 120 of the sleeve bearing 12 so that the motor rotor 30 is rotatably connected to the axial seat 10. Generally, lubricant contained in the sleeve bearing 12 may be driven due to rotation of the shaft 31. The lubricant successively flows through an inner circumference of the axial hole 120, an end surface of the sleeve bearing 12, an inclined surface 121 of the sleeve bearing 12, and a gap between the axial tube 11 and the sleeve bearing 12. Finally, the lubricant returns to the inside of the sleeve bearing 12. Thus, the lubricant contained in the sleeve bearing 12 is automatically circulated to lubricate the inner circumference of the axial hole 120 so as to attenuate abrasion of the axial hole 120 caused by rotation of the shaft 31. Consequently, it reduces rotational noise and prolongs useful life of the bearing.

Generally, there exists a wide clearance A between a shaft seat 32 of the rotor 30 and the sleeve bearing 12. Although the lubricant of the sleeve bearing 12 is able to attenuate abrasion, discharging the lubricant from the axial tube 11 is unavoidable while operating. Foreign dust may enter the inside of the sleeve bearing 12 and the gap between the axial tube 11 and the sleeve bearing 12. Thus, it results in precipitation of the foreign dust on the sleeve bearing 12 and the gap between the axial tube 11 and the sleeve bearing 12 that produces greasy dirt 90. Circulating the lubricant on the sleeve bearing 12, the greasy dirt 90 is collected or precipitated in a space formed on the inclined surface 121 of the sleeve bearing 12. Once the greasy dirt 90 enters the gap between the axial tube 11 and the sleeve bearing 12, the circulation of the lubricant can be obstructed. Thus, the lubricant cannot flow freely through between the axial tube 11 and the sleeve bearing 12 and it results in an insufficiency of the lubricant between the axial hole 120 and the shaft 31. The rotational speed of the motor is reduced and the running temperature of the motor is increased. Consequently, the shaft 31 of the motor may be jammed and the useful life of the motor is shortened. Hence, there is a need for an improvement of the conventional bearing structure.

To this end, U.S. Pat. No. 6,336,745, titled "OIL-IMPREGNATED BEARING AND ROTOR SHAFT," and U.S. Pat. No. 6,435,722, titled "COMBINATION STRUCTURE FOR OIL-IMPREGNATED BEARING," discloses a conventional bearing structure including an axial seat, a motor stator, a motor rotor, an axial tube and an oil-impregnated bearing. The bearing structure further includes a cap disposed on an end surface of the oil-impregnated bearing, and a shaft of the motor rotor includes a cushion ring arranged between the cap and the oil-impregnated bearing. In rotational operation, the cap and the cushion ring are commonly used to prevent leaking lubricant from the oil-impregnated bearing, and entering dust into the oil-impregnated bearing. However, the combination of the cap, the cushion ring and the oil-impregnated bearing is complicated that results in a disadvantage of assembling motor's members. It is important to note that an axial hole of the cap has a diameter significantly greater than an outer diameter of a shaft seat of the motor rotor. If an axial length of the sleeve bearing is relatively short, a clearance between the sleeve bearing and the shaft seat is enlarged. In use, it is inevitable that lubricant leaks out from the oil-impregnated bearing and foreign dust may enter into the oil-impregnated bearing through the cap. Thus, it results in an insufficiency of the lubricant between the axial hole and the shaft. The rotational speed of the motor is reduced and the running temperature of the motor is increased. Consequently, the shaft of the motor may be jammed and the useful life of the motor is shortened. Hence, there is a need for an improvement of the conventional bearing structure.

The present invention intends to provide a dustproof structure for a sleeve bearing which includes an axial tube in which to tightly mount a sleeve bearing and a dustproof cushion. The dustproof cushion is provided with an axial thickness to compensate a clearance between the sleeve bearing and a shaft seat so that a single (one-size) length of the sleeve bearing is suitable for various axial lengths of the axial tube. Furthermore, the dustproof cushion bears an axial hole having a diameter smaller than an outer diameter of the shaft seat to minimize a clearance between the dustproof cushion and the shaft seat. The compensating axial thickness of the dustproof cushion is applied to adjust the clearance between the sleeve bearing and a shaft seat in such a way to mitigate and overcome the above problem.

SUMMARY OF THE INVENTION

The primary objective of this invention is to provide a dustproof structure for a sleeve bearing, which includes an axial tube in which to tightly accommodate a sleeve bearing and a dustproof cushion. An axial thickness of the dustproof cushion is used to compensate a clearance between the sleeve bearing and a shaft seat of a motor rotor to prevent from entering foreign dust into the sleeve bearing.

The secondary objective of this invention is to provide the dustproof structure providing with the axial thickness of the dustproof cushion for compensating a clearance between the sleeve bearing and the shaft seat of the motor rotor. Thereby, a single (one-size) length of the sleeve bearing is suitable for various axial lengths of the axial tube.

Another objective of this invention is to provide the dustproof structure for the sleeve bearing, which provides with a buffer space or a rough surface of the dustproof cushion for increasing circulation efficiency of lubricant in the sleeve bearing.

Another objective of this invention is to provide the dustproof structure for the sleeve bearing, which provides with a barrier of the dustproof cushion for preventing from entering foreign dust.

The dustproof structure for the sleeve bearing in accordance with the present invention includes an axial tube, a sleeve bearing, a dustproof cushion and a motor rotor. The motor rotor has a shaft seat and a shaft mounted thereto. The axial tube accommodates the sleeve bearing which bears an axial hole through which the shaft of the motor rotor is freely extended. The dustproof cushion is mounted in the axial tube and attached to an end surface of the sleeve bearing to prevent from entering foreign dust. An axial thickness of the dustproof cushion is used to compensate a clearance formed between the sleeve bearing and the shaft seat, and a diameter of the dustproof cushion is smaller than an outer diameter of the shaft seat to prevent from precipitation of dust on the sleeve bearing.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings herein.

DETAILED DESCRIPTION OF THE INVENTION

Figure 1:
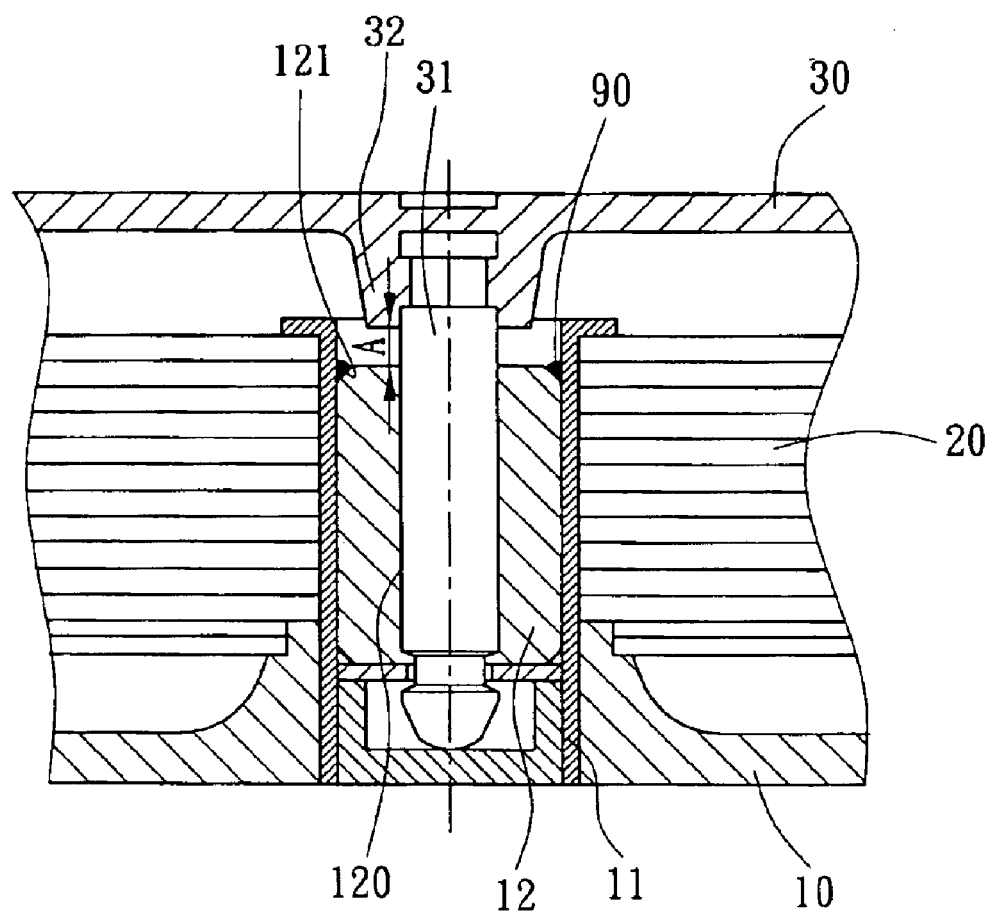
FIG. 1 is a cross-sectional view of a bearing structure for a motor in accordance with the prior art.

Referring initially to FIGS. 2 through 9, reference numerals of the four embodiments have applied the identical numerals of the conventional bearing structure, as shown in FIG. 1. The bearing structures of the embodiments have the similar configuration and same function as that of the conventional bearing structure and the detailed descriptions are omitted.

Figure 2:
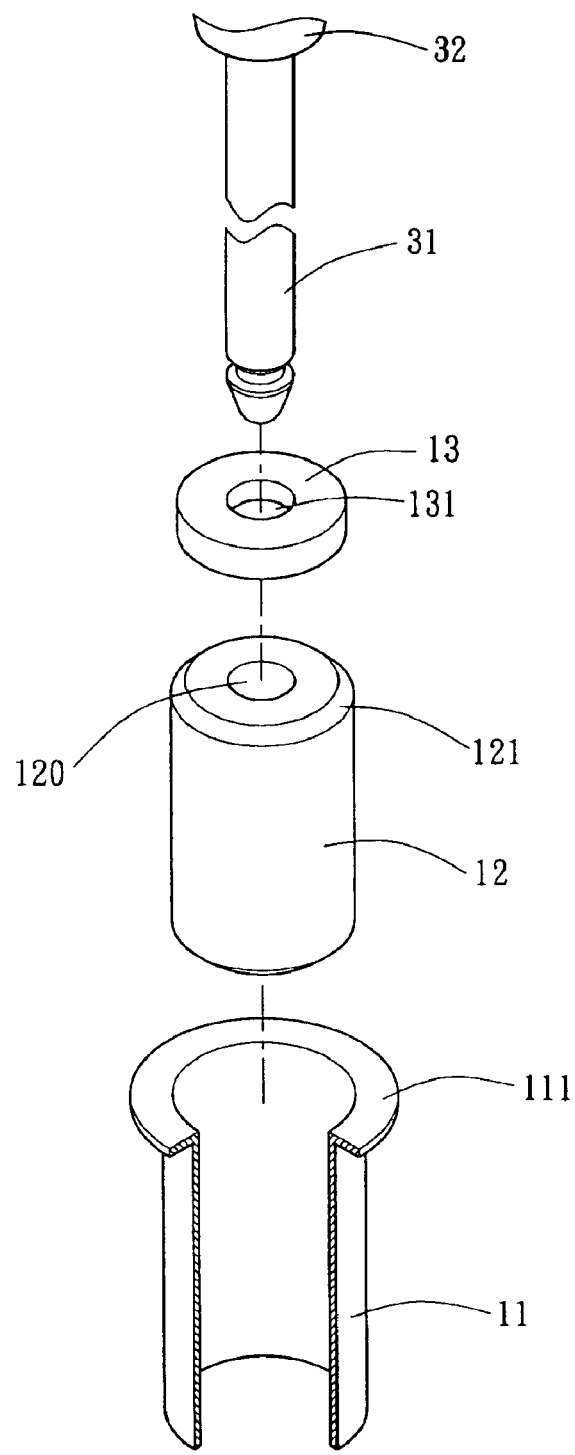
FIG. 2 is an exploded perspective view of a dustproof structure for a sleeve bearing in accordance with a first embodiment of the present invention.
Figure 3:
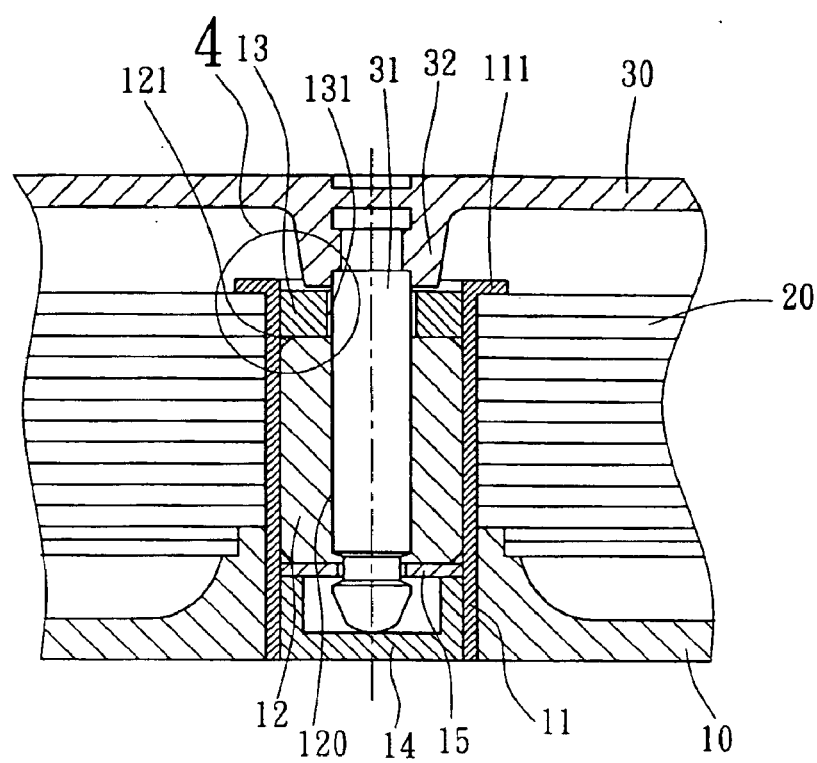
FIG. 3 is a cross-sectional view of the dustproof structure for the sleeve bearing in accordance with the first embodiment of the present invention.

Referring initially to FIGS. 2 and 3, a dustproof structure for a sleeve bearing in accordance with a first embodiment of the present invention includes an axial tube 11, a sleeve bearing 12, a dustproof cushion 13 and a motor rotor 30. The axial tube 11 is a tubular body mounted to an axial seat 10 and has an annular flange 111 at its top end for engaging with a motor stator 20. The axial tube 11 accommodates the sleeve bearing 12 which is an oil-impregnated bearing made of a suitable copper-based material by powder metallurgy or ceramic by sinter. The sleeve bearing 12 bears an axial hole 120 through which a shaft 31 of the motor rotor 30 is freely extended. The sleeve bearing 12 has an inclined surface 121 on its end surface. The dustproof cushion 13 is molded from a suitable plastics or metals material and has an axial hole 131.

Figure 4:
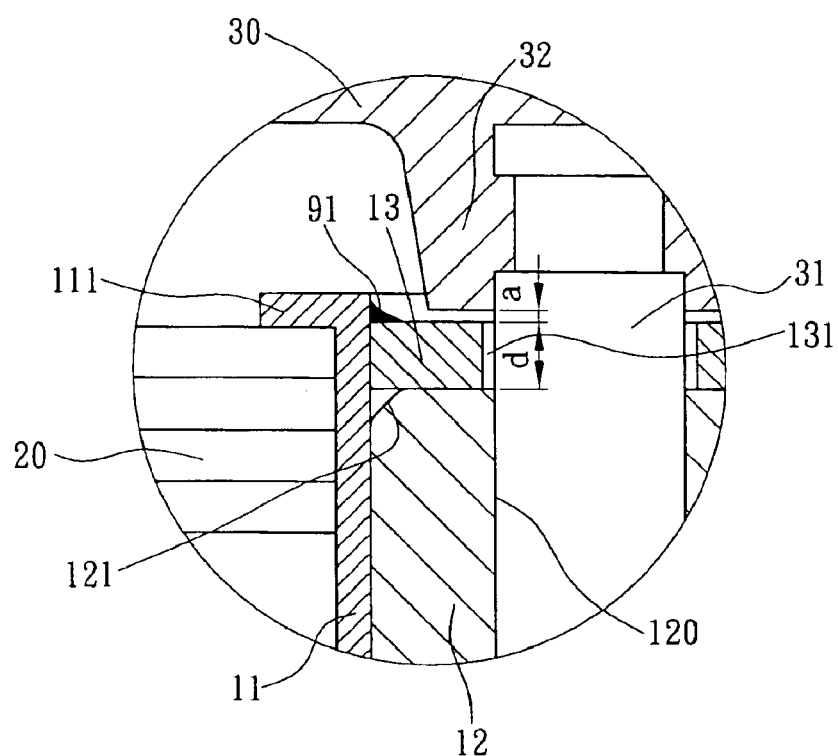
FIG. 4 is an enlarged view, in FIG. 3, of the dustproof structure for the sleeve bearing in accordance with the first embodiment of the present invention.

The motor rotor 30 has a shaft 31 and a shaft seat 32 from which to longitudinally extend the shaft 31. The shaft 31 is able to freely extend through the axial hole 120 of the sleeve bearing 12 and the axial hole 131 of the dustproof cushion 13 for allowing rotation when assembled. The dustproof cushion 13 is mounted in the axial tube 11 and attached to the end surface of the sleeve bearing 12 to prevent from entering foreign dust into the axial tube 11 and the sleeve bearing 12. The dustproof cushion 13 provides with a compensating axial thickness (d, as shown in FIG. 4) for compensating and minimizing a clearance between the sleeve bearing 12 and the shaft seat 32. Consequently, a minimum axial thickness (a, as shown in FIG. 4) remains between the dustproof cushion 13 and the axial seat 32 to prevent from entering foreign dust into axial tube 11 and the sleeve bearing 12. Meanwhile, the axial hole 131 of the dustproof cushion 13 has a diameter smaller than an outer diameter of the shaft seat 32 as well as the shaft seat 32 covers an inner periphery of the dustproof cushion 13.

The axial tube 11 further provides a cap 14 and a retaining member 15 at its bottom end. The cap 14 is used to support an end of the shaft 31 and reservoir lubricant for re-lubrication. The retaining member 15 is used to hold an end of the shaft 31 to prevent from the motor rotor 30 disassembling from the motor stator 20. The detailed operation of the dustproof structure for the sleeve bearing 12 will further be described below.

Turning now to FIGS. 3 and 4, the dustproof cushion 13 is positioned in the axial tube 11, when the axial seat 10, the axial tube 11, the sleeve bearing 12, the dustproof cushion 13, the cap 14, the retaining member 15, the motor stator 20 and the motor rotor 30 are commonly assembled to constitute a motor. The bottom surface of the dustproof cushion 13 is attached to the end surface of the sleeve bearing 12. After assembling, the dustproof cushion 13 provides with a compensating axial thickness (d) for compensating and minimizing the clearance between the sleeve bearing 12 and the shaft seat 32 that remains the minimum clearance between the dustproof cushion 13 and the shaft seat 32 (a). Owing to the smaller diameter of the axial hole 131 the dustproof cushion 13 is able to prevent from foreign dust entering into the axial tube 11 and the sleeve bearing 12. Once foreign dust enters the axial tube 11, the dustproof cushion 13 is able to prevent it entering into the inside of the sleeve bearing 12, and the gap between the axial tube 11 and the sleeve bearing 12. Finally, dust 91 may be precipitated on the dustproof cushion 13. Further, owing to the compensating axial length (d) of the axial hole 131 the dustproof cushion 12 is able to prevent from leaking lubricant from the sleeve bearing 12 and discharging it from the axial tube 11. In use, the lubricant flows through the end surface and the inclined surface 121 of the sleeve bearing 12 for entering into a gap formed between the axial tube 11 and the sleeve bearing 12 for circulation. The dustproof cushion 13 ensures not only preventing from the greasy dirt 90 precipitated on the sleeve bearing 12, as shown in FIG. 1, but also maintaining sufficient lubricity between the sleeve bearing 12 and the shaft 31. Consequently, it can avoid abrasion of the axial hole 131 and reduce operational noise to ensure accurate rotational speed and to prolong useful life of the motor.

Referring back to FIGS. 2 through 4, the compensating axial thickness (d) of the dustproof cushion 13 can be adjusted according to an axial length of the sleeve bearing 12. When various axial thicknesses of the motor is manufactured, the compensating axial thickness (d) of the dustproof cushion 13 is adjusted so that a single length (one-size specification) of the sleeve bearing 12 is suitable for various axial lengths of the axial tube 11 and the motor. Thereby, it reduces manufacture cost for various mold assemblies and carries out a universal use for the one-size specification of the sleeve bearing 12 in motor assembling.

Figure 5:
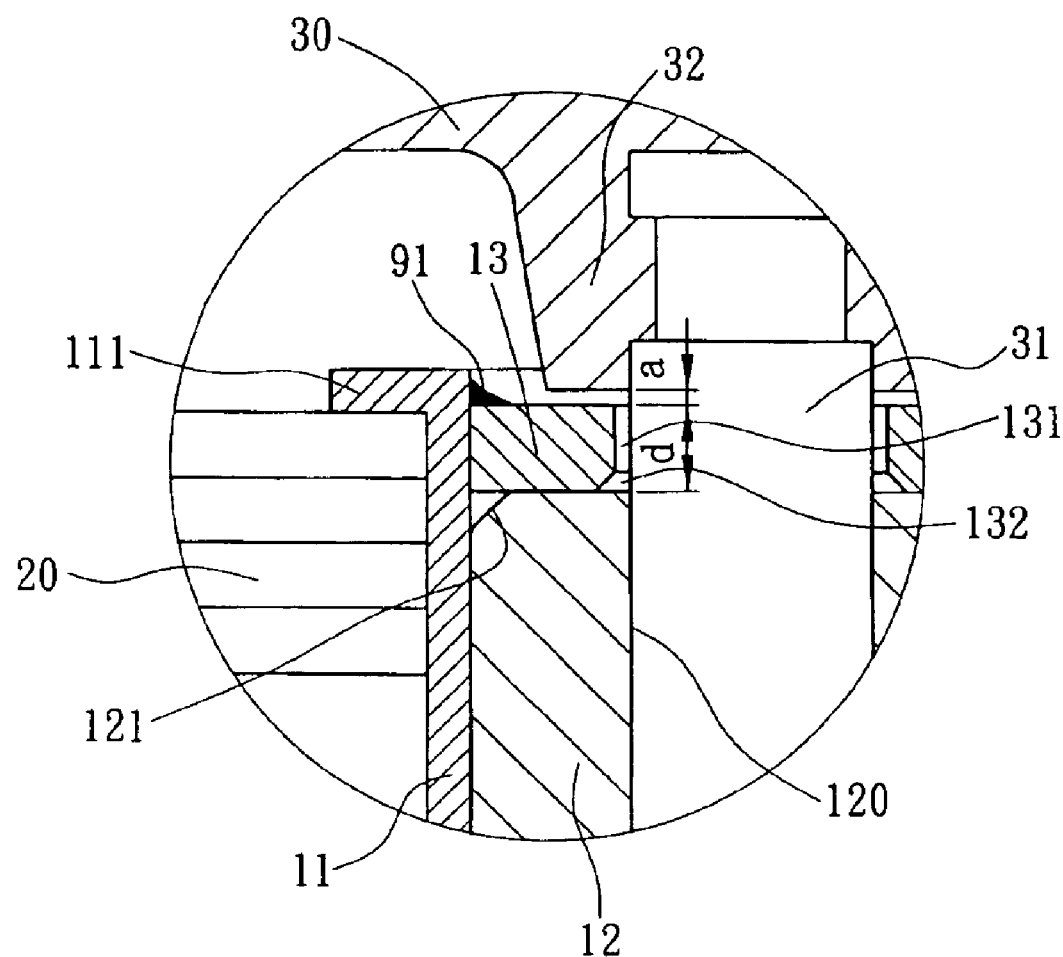
FIG. 5 is an enlarged cross-sectional view, similar to FIG. 4, of a dustproof structure for a sleeve bearing in accordance with a second embodiment of the present invention.

Turning now to FIG. 5, as is known in the first embodiment, a dustproof structure for a sleeve bearing in accordance with a second embodiment of the present invention includes an axial tube 11, a sleeve bearing 12, a dustproof cushion 13 and a motor rotor 30. In comparison with the first embodiment, the dustproof cushion 13 of the second embodiment has a buffer space 132 adjacent to the axial hole 131. The buffer space 132 extends along the periphery of the axial hole 131. Circulating the lubricant, it initially reservoirs in the buffer space 132 and subsequently flows through the end surface and the inclined surface 121 of the sleeve bearing 12 for increasing circulation efficiency of lubricant in the sleeve bearing 12.

Figure 6:
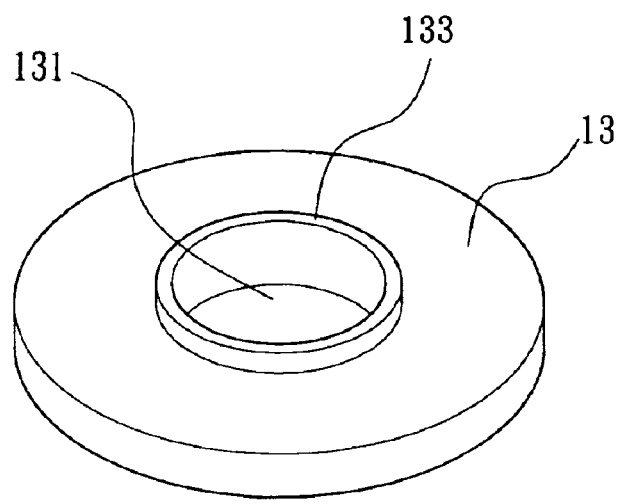
FIG. 6 is a perspective rear view of a dustproof cushion for a sleeve bearing in accordance with a third embodiment of the present invention.
Figure 7:
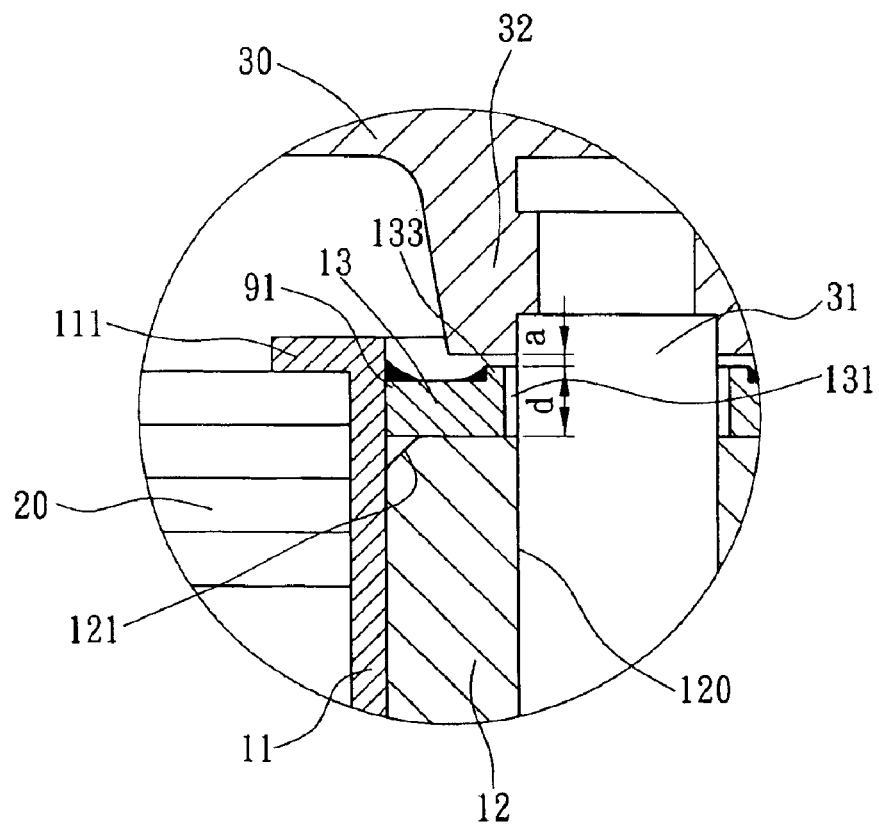
FIG. 7 is an enlarged cross-sectional view, similar to FIG. 4, of the dustproof structure for the sleeve bearing in accordance with the third embodiment of the present invention.

Turning now to FIGS. 6 and 7, as is known in the first embodiment, a dustproof structure for a sleeve bearing in accordance with a third embodiment of the present invention includes an axial tube 11, a sleeve bearing 12, a dustproof cushion 13 and a motor rotor 30. In comparison with the first embodiment, the dustproof cushion 13 of the third embodiment has an annular wall 133 projected upward from an inner pheriphery of the axial hole 131 that the entire structure is relatively rigid and strong. The dustproof cushion 13 and the annular wall 133 are commonly provided with a compensating axial length (d) and the height of the annular wall is used to adjust the compensating axial length (d) to constitute a minimum clearance (a) between the dustproof cushion 13 and the shaft seat 31. The annular wall 133 of the dustproof cushion 13 reduces entering foreign dust through the axial hole 131 in normal use and contains the precipitation of dust 91 for preventing obstruction of the circulation of the lubricant. Meanwhile, annular wall 133 of the dustproof cushion 13 also regards as a barrier that prevents discharging the lubricant leaked from the sleeve bearing 12 through the axial hole 131.

Figure 8:
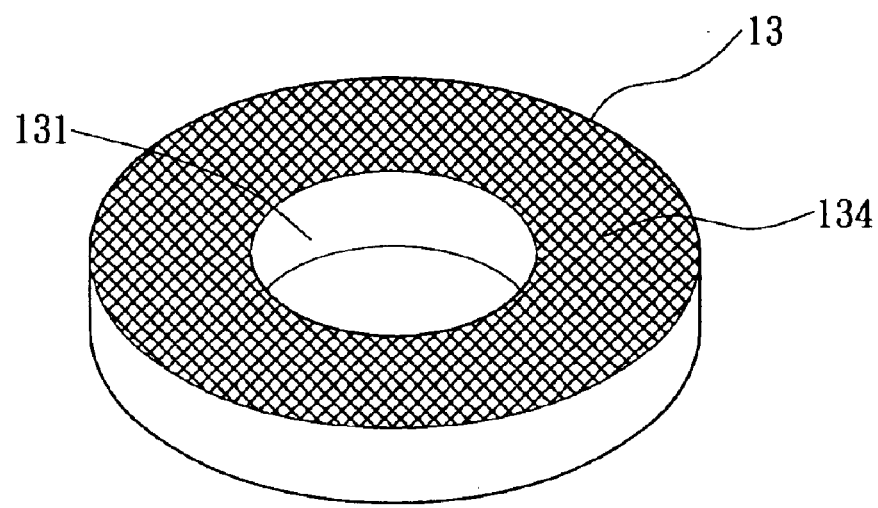
FIG. 8 is a rear perspective view, similar to FIG. 6, of a dustproof structure for a sleeve bearing in accordance with a fourth embodiment of the present invention.
Figure 9:
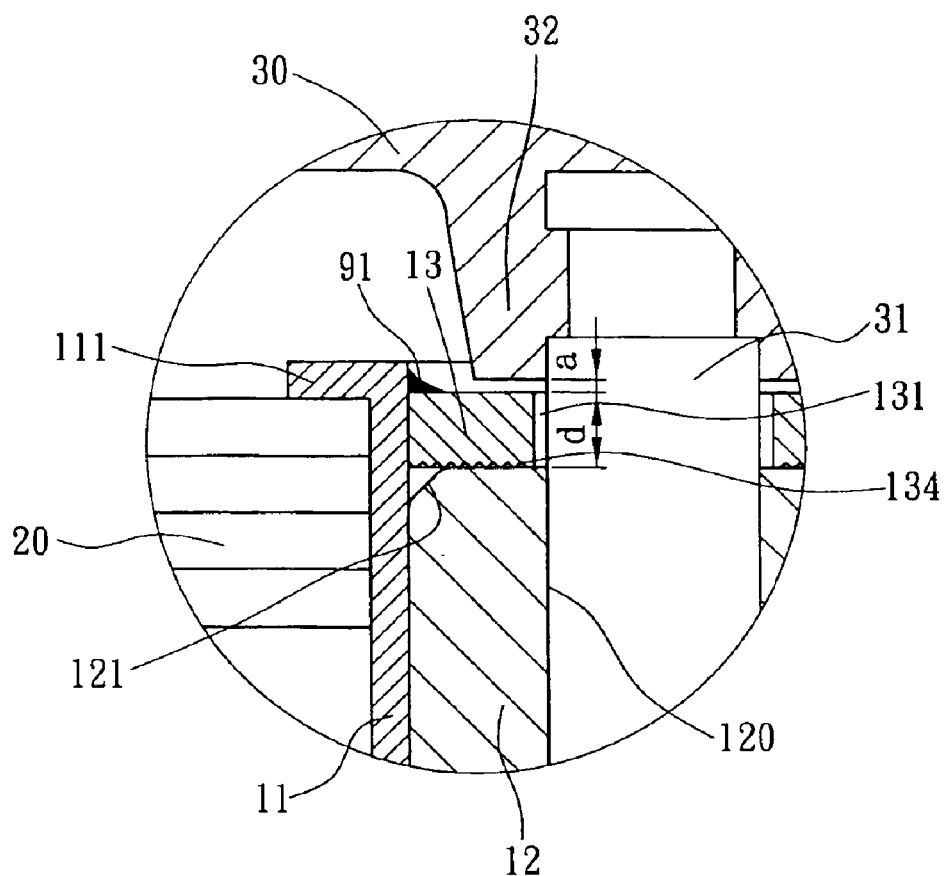
FIG. 9 is an enlarged cross-sectional view, similar to FIG. 4, of the dustproof structure for the sleeve bearing in accordance with the fourth embodiment of the present invention.

Turning now to FIGS. 8 and 9, as is known in the first embodiment, a dustproof structure for a sleeve bearing in accordance with a fourth embodiment of the present invention includes an axial tube 11, a sleeve bearing 12, a dustproof cushion 13 and a motor rotor 30. In comparison with the first embodiment, the dustproof cushion 13 of the fourth embodiment has a rough surface 134 facing to the inclined surface 121 of the sleeve bearing 12. In use, the lubricant leaked out from the sleeve bearing 12 is guided by the rough surface 134 and flows through between the end surface of the sleeve bearing 12 and the rough surface 134 of the dustproof cushion 13 to the inclined surface 121 of the sleeve bearing 12. Finally, the lubricant enters into a gap formed between the axial tube 11 and the sleeve bearing 12 for increasing circulation efficiency of the lubricant.

The conventional bearing structure, as shown in FIG. 1, may collect greasy dust 90 which obstructs the gap between the axial tube 11 and the sleeve bearing 12. In comparison with the conventional bearing structure, the dustproof cushion 13 of the present invention provides with a compensating axial thickness (d) to compensate a clearance between the sleeve bearing 12 and the shaft seat 32. Also, the dustproof cushion 13 of the present invention can prevents foreign dust from entering into the inside of the sleeve bearing 12, and the gap between the axial tube 11 and the sleeve bearing 12. Consequently, it can avoid abrasion of the axial hole 131 and reduce operational noise to ensure accurate rotational speed and to prolong useful life of the motor.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A dustproof structure for a sleeve bearing, comprising:
   an axial tube having a tubular body;
   a sleeve bearing mounted in the axial tube, the sleeve bearing including an axial hole;
   a motor rotor including a shaft and a shaft seat from which to longitudinally extend the shaft, the shaft is freely extended through the axial hole of the sleeve bearing; and
   a dustproof cushion received in the axial tube and attached to an end surface of the sleeve bearing, the dustproof cushion is provided with a compensating axial thickness to compensate a clearance between the sleeve bearing and the shaft seat, and the dustproof cushion further includes an axial hole having a diameter smaller than an outer diameter of the shaft seat to prevent entering dust into the sleeve bearing.

2. The dustproof structure for a sleeve bearing as defined in claim 1, wherein the shaft seat covers an inner periphery of the axial hole of the dustproof cushion.

3. The dustproof structure for a sleeve bearing as defined in claim 1, wherein dustproof cushion includes a buffer space adjacent to its axial hole.

4. The dustproof structure for a sleeve bearing as defined in claim 1, wherein the dustproof cushion includes the annular wall projected upward from an inner pheriphery of the axial hole that the entire structure is relatively rigid and strong.

5. The dustproof structure for the sleeve bearing as defined in claim 1, wherein the dustproof cushion further includes a rough surface for guiding lubricant.

6. The dustproof structure for the sleeve bearing as defined in claim 1, wherein the dustproof cushion is mounted in the axial tube and integrally connected thereto so that the dustproof cushion is precisely mounted.

* * * * *